United States Patent
Yamazaki et al.

(10) Patent No.: US 12,224,889 B2
(45) Date of Patent: Feb. 11, 2025

(54) ADAPTIVE EQUALIZATION FILTER AND METHOD FOR UPDATING FILTER COEFFICIENTS

(71) Applicant: NIPPON TELEGRAPH AND TELEPHONE CORPORATION, Tokyo (JP)

(72) Inventors: Etsushi Yamazaki, Musashino (JP); Seiji Okamoto, Musashino (JP); Masanori Nakamura, Musashino (JP); Kengo Horikoshi, Musashino (JP); Takeo Sasai, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/038,194

(22) PCT Filed: Nov. 25, 2020

(86) PCT No.: PCT/JP2020/043817
§ 371 (c)(1),
(2) Date: May 22, 2023

(87) PCT Pub. No.: WO2022/113204
PCT Pub. Date: Jun. 2, 2022

(65) Prior Publication Data
US 2023/0421420 A1 Dec. 28, 2023

(51) Int. Cl.
*H04L 25/03* (2006.01)
*H04L 27/01* (2006.01)

(52) U.S. Cl.
CPC ........ *H04L 27/01* (2013.01); *H04L 25/03057* (2013.01)

(58) Field of Classification Search
CPC .......... G06F 17/14; G06F 17/16; H03H 7/30; H03H 7/40; H04B 1/10; H04B 3/06;
(Continued)

(56) References Cited

U.S. PATENT DOCUMENTS

| 10,560,199 B2* | 2/2020 | Imoto | H04B 10/6161 |
| 2013/0308960 A1* | 11/2013 | Horikoshi | H03H 21/0012 398/209 |
| 2019/0074903 A1* | 3/2019 | Takamuku | H04B 10/2507 |

OTHER PUBLICATIONS

K. Kikuchi, "Fundamentals of Coherent Optical Fiber Communications," J. Lightwave Tech., vol. 34, No. 1, p. 157, 2016.

(Continued)

*Primary Examiner* — Shawkat M Ali
(74) *Attorney, Agent, or Firm* — Harness, Dickey & Pierce, P.L.C.

(57) ABSTRACT

An aspect of the present invention is an adaptive equalization filter for an optical transmission system, including: a main signal filter; and a coefficient computation unit that updates the filter coefficient of the main signal filter. The pre-stage filter and the post-stage filter receive a sample of the main signal as an input. The pre-stage coefficient computation unit obtains the filter coefficient of the pre-stage filter by feedback control using the gradient method. The post-stage coefficient computation unit obtains the filter coefficient of the post-stage filter by feedforward control. The convolution computation unit obtains the filter coefficient of the main signal filter by convolution computation of the filter coefficient of the pre-stage filter obtained by the pre-stage coefficient computation unit and the filter coefficient of the post-stage filter obtained by the post-stage coefficient computation unit.

8 Claims, 1 Drawing Sheet

(58) Field of Classification Search
CPC ........ H04B 10/00; H04B 10/06; H04B 10/61; H04B 10/69; H04L 5/06; H04L 25/03; H04L 25/03057; H04L 27/01; H04L 27/26
USPC ............... 375/232, 233, 260, 321, 340, 350; 398/65, 152, 159, 205, 209
See application file for complete search history.

(56) References Cited

OTHER PUBLICATIONS

D. N. Godard, "Self-recovering equalization and carrier tracking in two-dimensional data communication systems, "IEEE Trans. Comm., vol. 28, No. 11, 1980.

\* cited by examiner

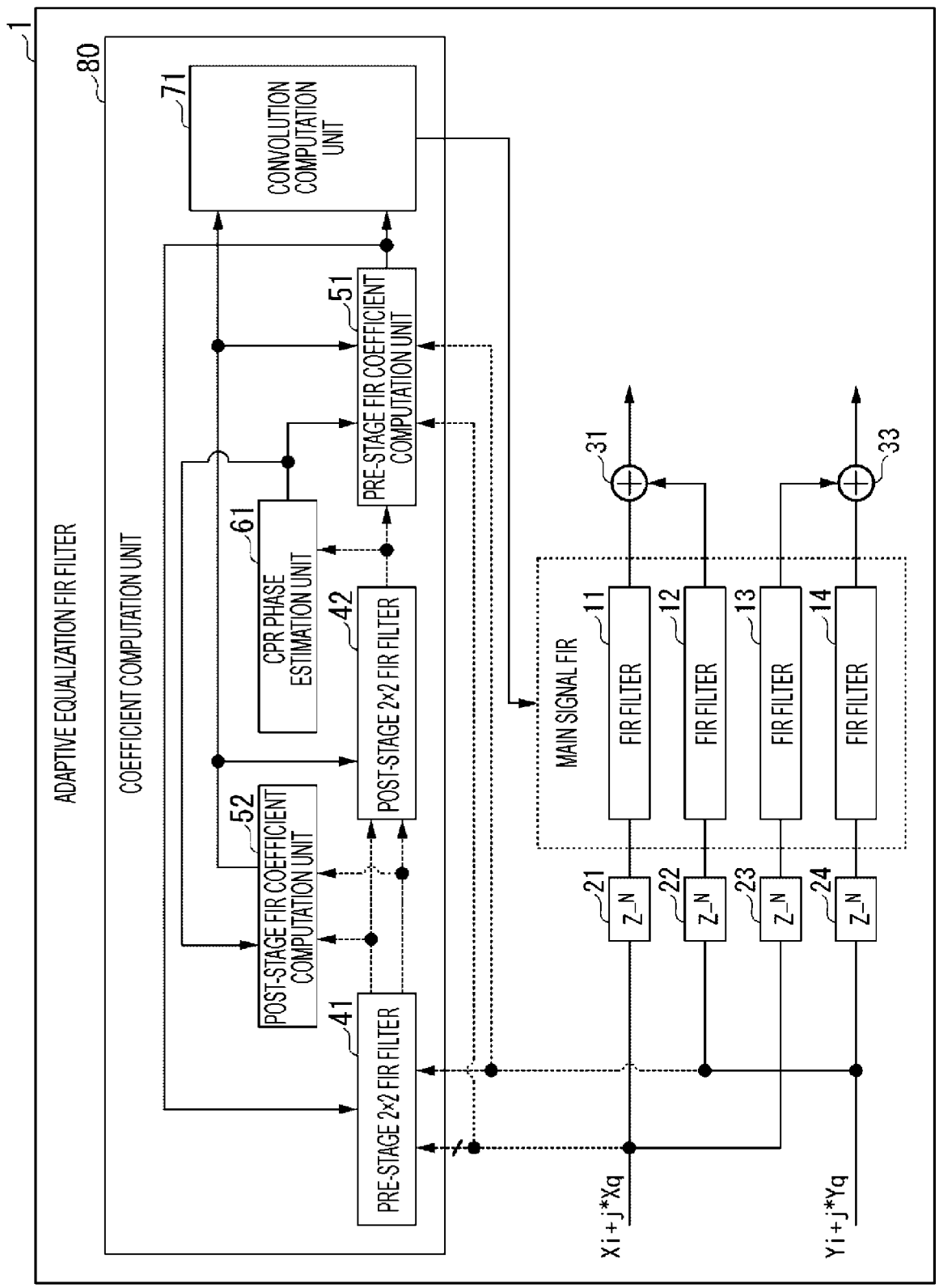

ADAPTIVE EQUALIZATION FILTER AND METHOD FOR UPDATING FILTER COEFFICIENTS

CROSS-REFERENCE TO RELATED APPLICATIONS

This application is a 371 U.S. National Phase of International Application No. PCT/JP2020/043817, filed on Nov. 25, 2020. The entire disclosure of the above application is incorporated herein by reference.

TECHNICAL FIELD

The present invention relates to technique of an adaptive equalization filter and a filter coefficient update method.

BACKGROUND ART

In digital coherent transmission, equalization processing is performed using digital signal processing (DSP) in order to compensate for waveform distortion generated in an optical fiber. In the equalization processing, an adaptive equalization filter is used to follow a dynamic change in waveform distortion. The filter coefficient thereof is generally controlled using the gradient method. Non Patent Literature 1 and Non Patent Literature 2 describe control of the filter coefficient using the gradient method.

For controlling the filter coefficient, it is required to follow the fluctuation of the polarization state due to the fluctuation of the optical fiber transmission line at high speed. As the polarization fluctuation resistance, for example, resistance to fluctuation such as a 50 kH term is required. It has also been reported that higher-speed polarization fluctuation occurs due to a lightning strike.

In a conventional transmission method, a method of transmitting a signal having a high symbol rate on a single carrier has been the mainstream. In a conventional transmission method, since the symbol rate is high, a sufficiently high following speed can be realized even by adaptive filter control using the gradient method. However, in recent years, there has been a report that it is effective to reduce the symbol rate of modulation from the viewpoint of minimizing non-linear degradation in optical fiber transmission. Therefore, a configuration in which a plurality of subcarriers is multiplexed at the stage of digital signal processing has attracted attention.

CITATION LIST

Non Patent Literature

Non Patent Literature 1: K. Kikuchi, "Fundamentals of Coherent Optical Fiber Communications," J. Lightwave Tech., Vol. 34, No. 1, p. 157, 2016.
Non Patent Literature 2: D. N. Godard, "Self-recovering equalization and carrier tracking in two-dimensional data communication systems," IEEE Trans. Comm., Vol. 28, No. 11, 1980.

SUMMARY OF INVENTION

Technical Problem

Two trends of lowering the modulation symbol rate of optical transmission and the need for high polarization fluctuation resistance pose challenges. That is, lowering the symbol rate such as subcarrier division transmission generally decreases the polarization fluctuation resistance. The adaptive equalization filter coefficient is updated using the gradient method, and the filter coefficient is updated using a known symbol and a data symbol at that time. Therefore, when the symbol rate decreases, the symbol arrival time interval increases, and thus, there is a problem that the fluctuation following speed decreases.

In view of the above circumstances, an object of the present invention is to provide technique capable of achieving both a high following speed and a high distortion compensation resistance even when the symbol rate decreases.

Solution to Problem

An aspect of the present invention is an adaptive equalization filter for an optical transmission system, including: a main signal filter; and a coefficient computation unit that updates a filter coefficient of the main signal filter, in which the coefficient computation unit includes: a pre-stage filter and a post-stage filter that are connected in cascade, each having a sample of a main signal as an input; a pre-stage coefficient computation unit that obtains a filter coefficient of the pre-stage filter by feedback control using a gradient method; a post-stage coefficient computation unit that obtains a filter coefficient of the post-stage filter by feedforward control; and a convolution computation unit that obtains a filter coefficient of the main signal filter by convolution computation of the filter coefficient of the pre-stage filter obtained by the pre-stage coefficient computation unit and the filter coefficient of the post-stage filter obtained by the post-stage coefficient computation unit.

An aspect of the present invention is a filter coefficient update method for updating a filter coefficient of a main signal filter, in which a pre-stage filter and a post-stage filter are connected in cascade, each having a sample of a main signal as an input, a pre-stage coefficient computation unit obtains a filter coefficient of the pre-stage filter by feedback control using a gradient method, a post-stage coefficient computation unit obtains a filter coefficient of the post-stage filter by feedforward control, and a convolution computation unit obtains a filter coefficient of the main signal filter by convolution computation of the filter coefficient of the pre-stage filter obtained by the pre-stage coefficient computation unit and the filter coefficient of the post-stage filter obtained by the post-stage coefficient computation unit.

Advantageous Effects of Invention

According to the present invention, it is possible to achieve both a high following speed and a high distortion compensation resistance even when the symbol rate decreases.

BRIEF DESCRIPTION OF DRAWINGS

FIG. 1 is a block diagram illustrating a configuration example of an adaptive equalization FIR filter according to an embodiment of the present invention.

DESCRIPTION OF EMBODIMENTS

An embodiment of the present invention will be described in detail with reference to the drawing.

FIG. 1 is a block diagram illustrating a configuration example of an adaptive equalization FIR filter according to the present embodiment. An adaptive equalization FIR filter 1 can be used as a part of an optical signal reception device or an optical signal relay device for an optical transmission system. The adaptive equalization FIR filter 1 executes a filter coefficient update method described below. As illustrated in the FIGURE, the adaptive equalization FIR filter 1 includes FIR filters 11, 12, 13, and 14, adders 31 and 33, and a coefficient computation unit 80.

The FIR filters 11, 12, 13, and 14 are filters each provided on a main signal path. The FIR filters 11, 12, 13, and 14 are also referred to as "main signal filters". A main signal path includes a single-stage 2×2 FIR filter. The filter coefficients of the FIR filters 11, 12, 13, and 14 are dynamically updated by the coefficient computation unit 80. X-polarized input signals are inputted to the FIR filters 11 and 13. Y-polarized input signals are inputted to the FIR filters 12 and 14. The FIR filters 11, 12, 13, and 14 act on the input signals on the basis of respective filter coefficients. Outputs from the FIR filters 11 and 12 are passed to the adder 31. Outputs from the FIR filters 13 and 14 are passed to the adder 33.

Each of the adder 31 and the adder 33 adds inputted signals and outputs the result. The adder 31 adds the signals from the FIR filters 11 and 12 and outputs the result as an X-polarized signal. The adder 33 adds the signals from the FIR filters 13 and 14 and outputs the result as a Y-polarized signal.

The coefficient computation unit 80 controls the FIR filters 11, 12, 13, and 14 provided on the main signal path. Specifically, the coefficient computation unit 80 acquires a sample of an input signal to the adaptive equalization FIR filter 1. The coefficient computation unit 80 calculates and updates the coefficients of the FIR filters 11, 12, 13, and 14 on the basis of the sample. The coefficient computation unit 80 is configured to perform feedforward control on a partial tap coefficient in order to increase the following speed of the adaptive equalization FIR filter 1.

The coefficient computation unit 80 includes a pre-stage 2×2 FIR filter 41, a post-stage 2×2 FIR filter 42, a pre-stage FIR coefficient computation unit 51, a post-stage FIR coefficient computation unit 52, a CPR phase estimation unit 61, and a convolution computation unit 71.

The pre-stage 2×2 FIR filter 41 and the post-stage 2×2 FIR filter 42 are two-stage 2×2 filters connected in cascade. Each of the pre-stage 2×2 FIR filter 41 and the post-stage 2×2 FIR filter 42 is a two-input two-output FIR filter. Note that a sample of a main signal is inputted to the sequence of the pre-stage 2×2 FIR filter 41 and the post-stage 2×2 FIR filter 42 connected in cascade. Note that a part of the inputted main signal is a known signal (known symbol). The coefficient computation unit 80 computes the filter coefficients of the pre-stage 2×2 FIR filter 41 and the post-stage 2×2 FIR filter 42 using the known symbol. The pre-stage 2×2 FIR filter 41 is also simply referred to as a "pre-stage filter". Moreover, the post-stage 2×2 FIR filter 42 is also simply referred to as a "post-stage filter".

The pre-stage FIR coefficient computation unit 51 obtains the coefficient of the pre-stage 2×2 FIR filter 41 using the steepest descent method (gradient method), and performs feedback control on the pre-stage 2×2 FIR filter 41. Note that the pre-stage FIR coefficient computation unit 51 is also simply referred to as a "pre-stage coefficient computation unit".

Specifically, the pre-stage FIR coefficient computation unit 51 obtains the filter coefficient of the pre-stage 2×2 FIR filter 42 using the gradient method in a manner such that the error between the output signal from the post-stage 2×2 FIR filter 41 and the known signal decreases.

More specifically, the pre-stage FIR coefficient computation unit 51 computes a complex error between the result of performing frequency offset compensation and carrier phase compensation on an output signal from the post-stage 2×2 FIR filter 42 and the known symbol at the same time position. Moreover, the pre-stage FIR coefficient computation unit 51 calculates an inner product of an input sample to the pre-stage 2×2 FIR filter 41 used to obtain an output signal from the post-stage 2×2 FIR filter 42 and the coefficient of the post-stage 2×2 FIR filter 42, further applies frequency offset compensation and carrier phase compensation, and obtains an update vector on the basis of a product of a complex conjugate of the application result and the complex error. More specifically, for example, the pre-stage FIR coefficient computation unit 51 calculates an inner product of input samples to the pre-stage 2×2 FIR filter 41, which are used to obtain the output signal from the post-stage 2×2 FIR filter 42 and the number of which is the same as the length of the post-stage 2×2 FIR filter 42 for one symbol of the output signal, and the coefficient of the post-stage 2×2 FIR filter 42, further applies the frequency offset compensation and the carrier phase compensation, and multiplies the product of a complex conjugate of the application result and the complex error by a step size to obtain an update vector. The pre-stage FIR coefficient computation unit 51 computes and updates the filter coefficient of the pre-stage 2×2 FIR filter 41 using the update vector.

The post-stage FIR coefficient computation unit 52 obtains the coefficient of the post-stage 2×2 FIR filter 42 using the minimum mean square error method (MMSE) or the like, and controls the post-stage 2×2 FIR filter 42. In other words, the post-stage FIR coefficient computation unit 52 controls the post-stage 2×2 FIR filter 42 with the feedforward configuration. Note that the post-stage FIR coefficient computation unit 52 is also simply referred to as a "post-stage coefficient computation unit".

Specifically, the post-stage FIR coefficient computation unit 52 obtains an inverse matrix of a covariance matrix of an input signal vector to the post-stage 2×2 FIR filter 42 using a plurality of sets of an input signal vector to the post-stage 2×2 FIR filter 42 and the known signal symbol at the time position obtained by applying the post-stage 2×2 FIR filter 42 to the input signal vector. The post-stage FIR coefficient computation unit 52 obtains a correlation vector between the known signal symbol and an input signal vector to the post-stage 2×2 FIR filter 42. Then, the post-stage FIR coefficient computation unit 52 applies the inverse matrix of the covariance matrix to the correlation vector, and obtains the filter coefficient of the post-stage 2×2 FIR filter 42 using the minimum mean square error method.

The post-stage FIR coefficient computation unit 52 may obtain the filter coefficient of the post-stage 2×2 FIR filter 42 with the following processing. That is, one of the coefficients of the length M taps of the two inputs of the post-stage 2×2 FIR filter 42 are denoted by hx[1], hx[2], . . . , and hx[M], and the other of the coefficients are denoted by hy[1], hy[2], . . . , and hy[M].

Then, the post-stage FIR coefficient computation unit 52 selects one or a plurality of tap time positions m among the above M taps, and performs the following processing on each of the selected m. The post-stage FIR coefficient computation unit 52 computes a provisional value y[m] of an output symbol of the post-stage FIR filter (42) by applying a filter coefficient at a tap time position other than the tap time position m to an input signal vector to the post-stage FIR filter (42). Moreover, the post-stage FIR coefficient computation unit 52 calculates a complex error between the complex value of the known signal symbol corresponding to the time position of the provisional value y[m] and the complex value of the provisional value y[m]. Moreover, the post-stage FIR coefficient computation unit 52 performs the following processing using one or a plurality of sets of the above complex error and an input signal vector to the post-stage 2×2 FIR filter 42 used to compute the provisional value y[m]. That is, the post-stage FIR coefficient computation unit 52 obtains an inverse matrix of the 2×2 covariance matrix of the input signal vector to the post-stage 2×2 FIR filter 42, obtains a correlation vector between the complex error and the input signal vector to the post-stage 2×2 FIR filter 42, and applies the inverse matrix of the 2×2 covariance matrix to the correlation vector to calculate hx[m] and hy[m], which are the m-th tap coefficients. Through the above processing, the post-stage FIR coefficient computation unit 52 obtains the filter coefficient of the post-stage 2×2 FIR filter 42.

Note that the post-stage FIR coefficient computation unit 52 may perform computation of multiplying each known signal by the complex conjugate of the phase rotation amount predicted from the estimated frequency offset amount. As a result, the error of the filter coefficient to be obtained can be reduced.

The post-stage FIR coefficient computation unit 52 may further perform computation of multiplying a symbol for which the carrier phase compensation amount has already been estimated by a complex conjugate of the carrier phase compensation amount for each of the known signals. Moreover, the post-stage FIR coefficient computation unit 52 may further perform computation of multiplying a symbol for which the carrier phase compensation amount has not been estimated yet by a complex conjugate of the representative value of the phase compensation amount of a symbol for which the carrier phase compensation amount has already been estimated.

The CPR phase estimation unit 61 estimates the carrier phase compensation amount.

The convolution computation unit 71 performs convolution computation of the coefficient of the pre-stage 2×2 FIR filter 41 obtained by the pre-stage FIR coefficient computation unit 51 and the coefficient of the post-stage 2×2 FIR filter 42 obtained by the post-stage FIR coefficient computation unit 52. A result of the convolution computation by the convolution computation unit 71 is used as coefficients of the FIR filters 11, 12, 13, and 14 of the main signal path. That is, the convolution computation unit 71 updates the coefficients of the FIR filters 11, 12, 13, and 14 using the above computation result.

Hereinafter, update processing of the tap coefficient of the main signal FIR filter will be described. A main parameter that determines the configuration of the circuit is first defined as follows. The main signal filter length is denoted by N_FIR. The tap length of the post-stage filter (post-stage 2×2 FIR filter 42) is denoted by N_PST. The filter length of the pre-stage filter (pre-stage 2×2 FIR filter 41) is denoted by N_PRE. N_PRE=N_FIR−N_PST+1 is satisfied. The averaging length of the tap coefficient calculation of the post-stage filter (post-stage 2×2 FIR filter 42) is denoted by N_PST_AVG.

The coefficient computation unit 80 computes a coefficient for updating the coefficient of the main signal filter using the known signal symbol.

That is, the coefficient computation unit 80 extracts continuous samples having the length N_FIR with a sample corresponding to the time position of the known symbol as the center, from samples of the signal inputted to the coefficient computation unit 80. The coefficient computation unit 80 updates the filter coefficient of the pre-stage 2×2 FIR filter 41 and updates the filter coefficient of the post-stage 2×2 FIR filter 42 using the extracted samples having the length N_FIR and the reference value of the known signal. The coefficient computation unit 80 calculates the filter coefficient of the main signal data by convolution computation of the filter coefficient of the pre-stage 2×2 FIR filter 41 and the filter coefficient of the post-stage 2×2 FIR filter 42. Moreover, the coefficient computation unit 80 also performs FOC compensation amount estimation and CPR compensation amount estimation. Note that FOC means "frequency offset compensation". Moreover, CPR means "carrier phase recovery". CPR is also referred to as "carrier phase regeneration".

The coefficient computation unit 80 repeatedly calculates the processing described below for each known symbol. The coefficient computation unit 80 may perform the calculation using all known symbols, or may select only necessary known symbols to use for the calculation.

The coefficient computation unit 80 extracts X-polarized and Y-polarized input data corresponding to the length N_FIR samples with a sample corresponding to the time position of the known symbol as the center, from input samples to the adaptive equalization FIR filter 1. Vectors of the input data extracted here having the length N_FIR are defined as fir_in_x_ps and fir_in_y_ps, respectively.

Next, the coefficient computation unit 80 computes the output of the pre-stage 2×2 FIR filter 42 for the N_PST samples necessary for the post-stage 2×2 FIR filter 41. The coefficient computation unit 80 extracts the first sample to the N_PRE-th sample respectively from the input data vectors fir_in_x_ps and fir_in_y_ps having the length N_FIR defined above, and generates a vector having the length N_PRE. The X-polarized vector and the Y-polarized vector are defined as xin and yin, respectively.

The four tap coefficients of the pre-stage 2×2 FIR filter 41 are denoted by pre_hxx, pre_hxy, pre_hyx, and pre_hyy. The X-polarized output value of the pre-stage 2×2 FIR filter 41 is obtained as the sum of the inner product of the vector xin and the coefficient pre_hxx, and the inner product of the vector yin and the coefficient pre_hxy. Similarly, the Y-polarized output of the pre-stage 2×2 FIR filter 41 is obtained as the sum of the inner product of the vector xin and the coefficient pre_hyx, and the inner product of the vector yin and the coefficient pre_hyy. The output value of the pre-stage 2×2 FIR filter 41 will be described as a scalar.

Next, the coefficient computation unit 80 performs similar processing on the second to the (N_PRE+1)-th xin and yin extracted respectively for vectors fir_in_x_ps and fir_in_y_ps, which are samples of input data to the pre-stage 2×2 FIR filter 41. As described above, the coefficient computation unit 80 repeats the processing N_PST times while advancing the position, thereby obtaining N_PST sample values to be inputs to the post-stage 2×2 FIR filter 42.

Moreover, the coefficient computation unit 80 acquires a reference value of a known symbol corresponding to the post-stage FIR output symbol. For example, assuming that amplitude values of the X-polarized in-phase component (Inphase) and quadrature component (Qudarature) of the known symbol at a certain time are denoted respectively by ps_ref_xi and ps_ref_xq, the complex signal is psx_ref=ps_ref_xi+jxps_ref_xq. Here, j is an imaginary unit. Similarly, when amplitude values of the in-phase component and the quadrature component for the Y polarization of the known symbol at a certain time are denoted respectively by ps_ref_yi and ps_ref_yq, the complex signal is psy_ref=ps_ref_yi+j×ps_ref_yq.

The coefficient computation unit 80 stores the input vectors having the above length N_PST samples to the post-stage 2×2 FIR filter 42 in a buffer together with the known symbol reference values corresponding thereto. In order to update the coefficients of the post-stage 2×2 FIR filter 42, a plurality of known symbols is used. When a predetermined number of sets of the input vector to the post-stage 2×2 FIR filter 42 and the known symbol reference value enough for normally computing the coefficient are stored, the post-stage FIR coefficient computation unit 52 executes computation for obtaining the coefficient of the post-stage 2×2 FIR filter 42. The post-stage FIR coefficient computation unit 52 can use again the set of the input value to the post-stage 2×2 FIR filter 42 and the known symbol reference value already used to calculate the coefficient of the post-stage 2×2 FIR filter 42.

The following description will describe a method in which the post-stage FIR coefficient computation unit 52 obtains the coefficient using only N_PST_AVG sets of the input value to the post-stage 2×2 FIR filter 42 and the known symbol reference value that are stored. As described above, N_PST_AVG is the averaging length of the tap coefficient calculation of the post-stage 2×2 FIR filter 42.

First, the coefficient computation unit 80 obtains the phase rotation amount for one symbol as the frequency offset compensation amount on the basis of the estimated FOC compensation amount. The coefficient computation unit 80 denotes a vector obtained by giving the obtained phase rotation amount for one symbol over the length of N_PST_AVG symbols as a phase difference between preceding and following symbols by foc_phi_vec. The post-stage FIR coefficient computation unit 52 may compensate for the phase rotation amount with a phase angle or as a complex value.

If there is a compensation amount in the time region already estimated by CPR (carrier phase recovery) that can be used in coefficient update of the post-stage 2×2 FIR filter 42, the coefficient computation unit 80 uses the compensation amount also as a phase compensation amount of a CPR estimation value to be described later.

Here, the symbol region used for coefficient update of the post-stage 2×2 FIR filter 42 also includes a symbol region for which the phase estimation processing for the subsequently-placed CPR (carrier phase recovery) has not been completed. In these symbol regions, the CPR compensation amount is not obtained. For these symbol regions, the phase compensation amount of the representative value is duplicated and used. The phase compensation amount of the representative value is, for example, a phase compensation amount of the last symbol of a region for which the CPR compensation amount has already been obtained.

That is, the post-stage FIR coefficient computation unit 52 may further perform computation of multiplying each of the known signals by the complex conjugate of the carrier phase compensation amount for the symbol for which the carrier phase compensation amount has already been estimated. Moreover, the post-stage FIR coefficient computation unit 52 may further perform computation of multiplying a symbol for which the carrier phase compensation amount has not been estimated yet by a complex conjugate of the representative value of the phase compensation amount of a symbol for which the carrier phase compensation amount has already been estimated.

The post-stage FIR coefficient computation unit 52 obtains the CPR phase compensation amount cpr_phi_vec of the length N_PST_AVG symbol as described above.

Next, the post-stage FIR coefficient computation unit 52 obtains a tap coefficient of the post-stage 2×2 FIR filter 42. As a method therefor, a plurality of methods will be described below.

First Method

A first method is a method of collectively obtaining all taps of the post-stage 2×2 FIR filter 42 using the minimum mean square error method.

An X-polarized input sample necessary for obtaining the output of one symbol from the post-stage 2×2 FIR filter 42 can be expressed as a row vector having the length N_PST. N_PST_AVG known symbols are used to update the coefficient of the post-stage 2×2 FIR filter 42. A matrix having N_PST_AVG rows in the vertical direction and N_PST columns in the horizontal direction in which row vectors of N_PST_AVG samples of the X-polarized input signal to the post-stage 2×2 FIR filter 42 corresponding to the time positions of the known symbols are arranged in the vertical direction is denoted by PST_xall. Similarly, on the Y polarization side of N_PST_AVG known symbols, a matrix having N_PST_AVG rows in the vertical direction and N_PST columns in the horizontal direction in which row vectors of N_PST_AVG samples of input signals to the post-stage 2×2 FIR filter 42 are arranged in the vertical direction is denoted by PST_yall. The two matrices PST_xall and PST_yall are coupled in the horizontal direction to obtain a matrix having N_PST_AVG rows in the vertical direction and 2×N_PST columns in the horizontal direction. This matrix is denoted by a X-polarized and Y polarized input sample matrix PST_xyall. The post-stage FIR coefficient computation unit 52 calculates a covariance matrix from the rectangular matrix PST_xyall. Specifically, the post-stage FIR coefficient computation unit 52 computes a matrix product of the phase conjugate transposed matrix of the matrix PST_xyall and the matrix PST_xyall, and further divides the matrix product by N_PST_AVG to obtain a covariance matrix. The covariance matrix calculated in this manner is a square matrix having a vertical size and a horizontal size of 2×N_PST.

Moreover, the post-stage FIR coefficient computation unit 52 arranges N_PST_AVG known symbols to be used for coefficient update of the post-stage 2×2 FIR filter 42 in the vertical direction to obtain a known symbol column vector ref (N_PST_AVG rows in the vertical direction and one column in the horizontal direction). The post-stage FIR coefficient computation unit 52 applies a complex conjugate transposed matrix of the X-polarized and Y-polarized input sample matrix PST_xyall to the above known symbol column vector ref, and further divides the result by N_PST_AVG to obtain a correlation vector cor_xy.

Note that there is a problem here that an error in the coefficient computation increases due to occurrence of phase rotation for each symbol in a case where there is a frequency offset. In order to solve this problem, the post-stage FIR coefficient computation unit 52 can reduce the error in the coefficient computation by multiplying each component of the above known symbol column vector ref by the complex conjugate of the frequency offset phase compensation vector foc_phi_vec.

Moreover, in a case where the phase noise is large, the post-stage FIR coefficient computation unit 52 similarly can reduce the error of the coefficient by multiplying each component of the known symbol column vector ref by the complex conjugate of the CPR phase compensation amount vector cpr_phi_vec. That is, the post-stage FIR coefficient computation unit 52 may perform computation of multiplying each known signal by the complex conjugate of the phase rotation amount predicted from the estimated frequency offset amount.

In a case where the frequency offset compensation or the phase noise compensation are performed, the post-stage FIR coefficient computation unit 52 applies the complex conjugate transposed matrix of the X-polarized and Y-polarized input sample matrix PST_xyall to the known symbol column vector ref, and further divides the result by N_PST_AVG to obtain the correlation vector cor_xy.

The post-stage FIR coefficient computation unit 52 can obtain the tap coefficient of the post-stage 2×2 FIR filter 42 by computing the inverse matrix of the covariance matrix for the correlation vector cor_xy obtained above. The tap coefficient obtained here has a length of 2×N_PST, and is obtained by coupling hxx and hxy.

Second Method

Next, a second method for obtaining the tap coefficient of the post-stage 2×2 FIR filter 42 will be described. In the second method, the coefficient of the post-stage 2×2 FIR filter 42 is simply computed using inverse matrix computation of a 2×2 matrix (matrix having two rows in the vertical direction and two columns in the horizontal direction) in order to avoid a mounting load for computing an inverse matrix of a matrix having three or more dimensions. The tap coefficients having the length N_PST of the post-stage 2×2 FIR filter 42 are denoted by hxx[m], hxy[m], hyx[m], and hyy[m]. Here, m is an integer of 1 or more, and N_PST or less.

Similarly to the case of the first method, the input sample to the post-stage 2×2 FIR filter 42 can be expressed as a row vector having the length N_PST. A matrix having N_PST_AVG rows in the vertical direction and N_PST columns in the horizontal direction in which N_PST_AVG vectors of X-polarized input samples are arranged in the vertical direction is denoted by PST_xall. Similarly for the Y polarization side, a matrix having N_PST_AVG rows in vertical direction and N_PST columns in the horizontal direction in which N_PST_AVG input samples that are row vectors having the length N_PST are arranged in the vertical direction is denoted by PST_yall.

Known symbols corresponding to the output symbols outputted from the post-stage 2×2 FIR filter 42 on the basis of the above input samples are arranged in the vertical direction to obtain a known symbol column vector ref (N_PST_AVG rows in the vertical direction and one column in the horizontal direction).

The post-stage FIR coefficient computation unit 52 first obtains tap coefficients hxx[m] and hxy[m] corresponding to the number of taps of the X-polarized output. A selected m-th tap coefficient in the length N_PST of the coefficient is represented as hxx[m] and hxy[m]. The m is an integer of 1 or more, and N_PST or less. All other tap coefficients are initial values or latest values that have been obtained at that time. The initial value may be, for example, zero. Alternatively, a value after the previous coefficient update may be used as the initial value. The post-stage FIR coefficient computation unit 52 performs filter computation using an initial value as a filter coefficient other than the selected m-th coefficient to obtain a provisional output y[m]. Then, the post-stage FIR coefficient computation unit 52 calculates the m-th tap coefficient by a 2×2 matrix minimum mean square error method (MMSE) with the difference between the known symbol reference value and the above provisional output y[m] as a target value. Specifically, the post-stage FIR coefficient computation unit 52 extracts the m-th column corresponding to the m-th tap coefficient from the above-described X-polarized input matrix PST_xall to obtain PST_xall[:, m]. Similarly for the Y-polarization, the post-stage FIR coefficient computation unit 52 extracts the m-th column corresponding to the m-th tap coefficient from the input matrix PST_yall to obtain PST_yall[:, m]. The post-stage FIR coefficient computation unit 52 couples the two column vectors PST_xall[:, m] and PST_yall[:, m] in the horizontal direction to obtain a rectangular matrix having N_PST_AVG rows in the vertical direction and two columns in the horizontal direction. This matrix is referred to as an m-th XY-polarized input matrix. The post-stage FIR coefficient computation unit 52 performs matrix computation (multiplication) of the complex conjugate transposed matrix of the m-th XY-polarized input matrix and the m-th XY-polarized input matrix, and further divides the result by N_PST_AVG to obtain a 2×2 covariance matrix.

Moreover, the post-stage FIR coefficient computation unit 52 computes a complex conjugate transposed matrix of the m-th XY-polarized input matrix for the known symbol column vector ref to obtain a two-component column vector.

The post-stage FIR coefficient computation unit 52 computes the 2×2 covariance matrix for the two-component column vector to obtain hxx[m] and hxy[m].

The post-stage FIR coefficient computation unit 52 performs the above operation for each m satisfying 1 m N_PST, that is, repeats the above operation for the number of taps N_PST while changing m, to obtain all the filter coefficients of the post-stage 2×2 FIR filter 42. Note that the order in which the post-stage FIR coefficient computation unit 52 selects m may be, for example, a method of starting from the center tap and sequentially selecting the peripheral taps outward.

The post-stage FIR coefficient computation unit 52 may further repeat the operation of obtaining a coefficient for each above m satisfying 1 m N_PST a plurality of times. The post-stage FIR coefficient computation unit 52 can increase the accuracy of the estimation value by performing such repetition. In this case, specifically, the post-stage FIR coefficient computation unit 52 can use the filter coefficients of N_PST time positions obtained at the i-th time (i≥1) as the (i+1)-th (next) initial value. Also in the i-th operation (i≥2), similarly to the first operation described above, the post-stage FIR coefficient computation unit 52 can repeat estimation of coefficients other than the filter coefficient at the m-th time position by using the latest value obtained at that time.

Moreover, the post-stage FIR coefficient computation unit 52 may select, for example, two tap time positions as the m, and perform similar computation for the selected two tap time positions in parallel. In this case, the post-stage FIR coefficient computation unit 52 selects, for example, two time positions of m1 and m2 when obtaining a provisional output value of the post-stage 2×2 FIR filter 42.

In the computation of obtaining the m1-th tap coefficient, the post-stage FIR coefficient computation unit 52 uses the latest value obtained at that time including hxx[m2] and hxy[m2] as coefficients excluding hxx[m1] and hxy[m1]. The post-stage FIR coefficient computation unit 52 computes a filter on the basis of such a coefficient, obtains a provisional output value y[m1], and obtains an error from the known symbol. Furthermore, the post-stage FIR coefficient computation unit 52 obtains hxx[m1] and hxy[m1] by computation of a two-dimensional minimum mean square error method (MMSE) using the m1-th XY-polarized input matrix, similarly to the above description.

At the same time as the above m1-th time, the post-stage FIR coefficient computation unit 52 uses the latest value obtained at that time including hxx[m1] and hxy[m1] as coefficients excluding hxx[m2] and hxy[m2] in the computation for obtaining the m2-th tap coefficient. The post-stage FIR coefficient computation unit 52 performs computation of a filter on the basis of such a coefficient, obtains a provisional output value y[m2], and obtains an error from the known symbol. Furthermore, the post-stage FIR coefficient computation unit 52 obtains hxx[m2] and hxy[m2] by computation of a two-dimensional minimum mean square error method (MMSE) using the m2-th XY-polarized input matrix, similarly to the above description.

As described above, the post-stage FIR coefficient computation unit 52 performs computation of obtaining the tap coefficients for a plurality of time positions of the post-stage 2×2 FIR filter 42 in parallel, so that there is an advantage that the time required to calculate the coefficients can be reduced as a whole. Note that, although an example of obtaining the tap coefficients for two time positions (m1 and m2) in parallel has been described above, tap coefficients for three or more time positions may be obtained in parallel.

Here, there is a problem that a coefficient computation error may increase because a phase rotation occurs for each symbol in a case where there is a frequency offset. In order to solve this problem, the post-stage FIR coefficient computation unit 52 may multiply each component of the known symbol column vector by the complex conjugate of the frequency offset phase compensation vector foc_phi_vec. As a result, the error in the coefficient obtained by the post-stage FIR coefficient computation unit 52 can be reduced. Moreover, in a case where the phase noise is large, the post-stage FIR coefficient computation unit 52 may similarly multiply each component of the known symbol column vector by the complex conjugate of the CPR phase compensation amount vector cpr_phi_vec. As a result, the error in the coefficient obtained by the post-stage FIR coefficient computation unit 52 can be reduced.

The post-stage FIR coefficient computation unit 52 can obtain a coefficient close to the n-tap coefficient that is the computation result of a multi-dimensional minimum mean square error method (MMSE) by repeating the above computation a plurality of times. The filter coefficients hyx and hyy for obtaining the Y-polarized output can also be obtained by a method similar to that for the X-polarized output.

The post-stage 2×2 FIR filter 42 obtains an X-polarized and Y-polarized output using the filter coefficient obtained by the post-stage FIR coefficient computation unit 52. The CPR phase estimation unit 61 estimates the carrier phase compensation amount by comparing the obtained X-polarized output value and the Y-polarized output value with the known symbol. By averaging the errors between the output value from the post-stage 2×2 FIR filter 42 and the known symbol over a plurality of symbols by the CPR phase estimation unit 61, a stable CPR estimation value can be obtained even under a condition where noise is large.

Moreover, the frequency offset can also be estimated by detecting a difference between the preceding and following symbols of the carrier phase compensation amount, that is, by detecting the slope of the carrier phase compensation amount. The coefficient computation unit 80 compensates for the carrier phase of the output from the post-stage FIR coefficient computation unit 52 using the obtained frequency offset estimation value and carrier phase compensation amount, and restores the transmission state.

The pre-stage FIR coefficient computation unit 51 updates the tap coefficient of the pre-stage 2×2 FIR filter 41 using the error between the signal on which the frequency offset compensation and the carrier phase compensation have been performed and the known symbol. Specifically, the pre-stage FIR coefficient computation unit 51 subtracts the carrier-phase-compensated output signal from the known symbol reference value to obtain the error. The error for X-polarization is denoted by e_x. The error for Y polarization is denoted by e_y. Each of the errors e_x and e_y is a complex error.

In the computation for updating the filter coefficient of the pre-stage 2×2 FIR filter 41, the input value to the pre-stage 2×2 FIR filter 41 corresponding to the output symbol of the carrier phase compensation used to obtain the symbol, and the filter coefficient of the post-stage 2×2 FIR filter 42 used to compute the symbol are also required. In practice, these values are held in a buffer, and the pre-stage FIR coefficient computation unit 51 is configured to read the values from the buffer. This is because a processing delay occurs until the output of the carrier phase compensation is obtained. Instead of holding the above values in a buffer, a delay may be given in the circuit to hold the value.

In order to obtain one output symbol of carrier phase compensation, N_PST samples are required as inputs to the post-stage 2×2 FIR filter 42. A matrix in which continuous samples of input values to the pre-stage 2×2 FIR filter 41 used to obtain respective input values to the post-stage 2×2 FIR filter 42 are arranged in the horizontal direction as column vectors by the amount of the input samples to the post-stage 2×2 FIR filter 42 is defined as a pre-stage 2×2 FIR filter input matrix. Pre-stage 2×2 FIR filter input matrices respectively for X polarization and Y polarization are denoted by pre_in_x and pre_in_y. The size of each of the matrices pre_in_x and pre_in_y is N_PRE rows in the vertical direction and N_PST columns in the horizontal direction.

The pre-stage FIR coefficient computation unit 51 can calculate an update vector of the coefficient of the pre-stage 2×2 FIR filter 41 by the gradient method. In this calculation, the pre-stage FIR coefficient computation unit 51 uses the above pre-stage FIR filter input matrices pre_in_x and pre_in_y respectively for X polarization and Y polarization, the errors e_x and e_y obtained respectively by the carrier phase compensation outputs for X polarization and Y polarization, and phi_x and phi_y that are complex number representations of carrier phase compensation amounts respectively for X polarization and Y polarization.

The configuration of the pre-stage 2×2 FIR filter 41 is as follows. That is, the pre-stage 2×2 FIR filter 41 includes a portion having the sum of the X-polarized input multiplied by pre_hxx and the Y-polarized input multiplied by pre_hxy as the X-polarized output. Moreover, the pre-stage 2×2 FIR filter 41 includes a portion having the sum of the X-polarized input multiplied by pre_hyx and the Y-polarized input multiplied by pre_hyy as the Y-polarized output.

The update vector of the coefficient pre_hxx of the pre-stage 2×2 FIR filter 41 is calculated by the following formula.

$$e\_x \times \mathrm{conj}(pre\_in\_x \times hxx \times phi\_x) + e\_y \times \mathrm{conj}(pre\_in\_x \times hyx \times phi\_y);$$

The update vector of the coefficient pre_hxy of the pre-stage 2×2 FIR filter 41 is calculated by the following formula.

$$e\_x \times \text{conj}(pre\_in\_y \times hxx \times phi\_x) + e\_y \times \text{conj}(pre\_in\_y \times hyx \times phi\_y);$$

The update vector of the coefficient pre_hyx of the pre-stage 2×2 FIR filter 41 is calculated by the following formula.

$$e\_x \times \text{conj}(pre\_in\_x \times hxy \times phi\_x) + e\_y \times \text{conj}(pre\_in\_x \times hyy \times phi\_y);$$

The update vector of the coefficient pre_hyy of the pre-stage 2×2 FIR filter 41 is calculated by the following formula.

$$e\_x \times \text{conj}(pre\_in\_y \times hxy \times phi\_x) + e\_y \times \text{conj}(pre\_in\_y \times hyy \times phi\_y);$$

In each of the above formulas, conj( ) means a complex conjugate. The pre-stage FIR coefficient computation unit 51 updates each coefficient by multiplying each of the update vectors by a step size and adding the result to the latest coefficient (pre_hxx, pre_hxy, pre_hyx, and pre_hyy, respectively).

In other words, the pre-stage FIR coefficient computation unit 51 performs the following processing. The pre-stage FIR coefficient computation unit 51 performs frequency offset compensation and carrier phase compensation on the output of the post-stage 2×2 FIR filter 42. For the output of the frequency offset compensation and the carrier phase compensation, the pre-stage FIR coefficient computation unit 51 computes a complex error from the known symbol corresponding to the time position. In order to obtain an output from the post-stage 2×2 FIR filter 42 corresponding to a time position of a certain known signal symbol, the pre-stage FIR coefficient computation unit 51 obtains an inner product of the coefficient of the pre-stage 2×2 FIR filter 42 and continuous (N−M+1) samples obtained by multiplication by the coefficient of the n-th pre-stage 2×2 FIR filter 41 in the convolution computation of the pre-stage 2×2 FIR filter 41, which are input samples to the pre-stage 2×2 FIR filter 41 used to obtain (N−M+1 samples) inputted to the post-stage 2×2 FIR filter 42. Furthermore, the pre-stage FIR coefficient computation unit 51 multiplies the inner product value by a complex number representing the phase rotation for frequency offset compensation and a complex number representing the phase rotation for carrier phase compensation, which are applied to the output from the post-stage 2×2 FIR filter 42. The pre-stage FIR coefficient computation unit 51 obtains an update vector by multiplying the value obtained by computing a product of the complex conjugate and the complex error by a step size. The pre-stage FIR coefficient computation unit 51 adds the update vector to the coefficient of the n-th pre-stage 2×2 FIR filter 41 and sets the result as the coefficient of the n-th pre-stage 2×2 FIR filter 41.

[Convolution Computation]

By the processing process described above, the coefficient of the pre-stage 2×2 FIR filter 41 and the coefficient of the post-stage 2×2 FIR filter 42 optimized using the known signal are individually obtained. The convolution computation unit 71 obtains the tap coefficient of the main signal filter by the convolution computation of the optimized coefficients of the pre-stage FIR and the post-stage FIR.

Specifically, the convolution computation unit 71 obtains the tap coefficient of X-polarized input—X-polarized output of the main signal filter as the sum of the convolution sequence of the coefficient hxx of the post-stage 2×2 FIR filter 42 and the coefficient pre_hxx of the pre-stage 2×2 FIR filter 41 and the convolution sequence of the coefficient hxy of the post-stage 2×2 FIR filter 42 and the coefficient pre_hyx of the pre-stage 2×2 FIR filter 41. That is, the tap coefficient of X-polarized input—X-polarized output of the main signal filter is computed as conv(hxx, pre_hxx)+conv(hxy, pre_hyx). Note that, con( ) here represents convolution computation, and the same applies to the following.

Moreover, the convolution computation unit 71 obtains the tap coefficient of Y-polarized input—X-polarized output of the main signal filter as the sum of the convolution sequence of the coefficient hxx of the post-stage 2×2 FIR filter 42 and the coefficient pre_hxy of the pre-stage 2×2 FIR filter 41 and the convolution sequence of the coefficient hxy of the post-stage 2×2 FIR filter 42 and the coefficient pre_hyy of the pre-stage 2×2 FIR filter 41. That is, the tap coefficient of Y-polarized input—X-polarized output of the main signal filter is computed as conv(hxx, pre_hxy)+conv(hxy, pre_hyy).

Moreover, the convolution computation unit 71 obtains the tap coefficient of X-polarized input—Y-polarized output of the main signal filter as the sum of the convolution sequence of the coefficient hyx of the post-stage 2×2 FIR filter 42 and the coefficient pre_hxx of the pre-stage 2×2 FIR filter 41 and the convolution sequence of the coefficient hyy of the post-stage 2×2 FIR filter 42 and the coefficient pre_hyx of the pre-stage 2×2 FIR filter 41. That is, the tap coefficient of X-polarized input—Y-polarized output of the main signal filter is computed as conv(hyx, pre_hxx)+conv(hyy, pre_hyx).

Moreover, the convolution computation unit 71 obtains the tap coefficient of Y-polarized input—Y-polarized output of the main signal filter as the sum of the convolution sequence of the coefficient hyx of the post-stage 2×2 FIR filter 42 and the coefficient pre_hxy of the pre-stage 2×2 FIR filter 41 and the convolution sequence of the coefficient hyy of the post-stage 2×2 FIR filter 42 and the coefficient pre_hyy of the pre-stage 2×2 FIR filter 41. That is, the tap coefficient of Y-polarized input—Y-polarized output of the main signal filter is computed as conv(hyx, pre_hxy)+conv(hyy, pre_hyy).

In the main signal FIR filter (FIR filters 11, 12, 13, and 14), the adaptive equalization FIR filter 1 applies the tap coefficient of X-polarized input—X-polarized output, the tap coefficient of Y-polarized input—X-polarized output, the tap coefficient of X-polarized input—Y-polarized output, and the tap coefficient of Y-polarized input—Y-polarized output obtained above. The adaptive equalization FIR filter 1 further applies FOC/CPR phase compensation on the main signal, and outputs the main signal after carrier phase compensation.

The computation and control functions of the adaptive equalization FIR filter 1 can be configured using a processor such as a central processing unit (CPU) or a graphics processing unit (GPU) and a memory. The above GPU may be configured to perform so-called GPGPU (general-purpose computing on graphics processing units; general-purpose computation by GPU). The processor executes the program to function as at least one of the FIR filters 11, 12, 13, and 14, the adders 31 and 33, and the coefficient computation unit 80 (the pre-stage 2×2 FIR filter 41, the post-stage 2×2 FIR filter 42, the pre-stage FIR coefficient computation unit 51, the post-stage FIR coefficient computation unit 52, the CPR phase estimation unit 61, and the convolution computation unit 71). Note that all or some of the functions of the adaptive equalization FIR filter 1 may be implemented by using hardware such as an application specific integrated circuit (ASIC), a programmable logic device (PLD), or a field programmable gate array (FPGA). The above program may be recorded on a computer-readable recording medium. The computer-readable recording medium is, for example, a portable medium such as a flexible disk, a magneto-optical disc, a ROM, a CD-ROM, or a semiconductor storage device (e.g., a solid state drive (SSD)), or a storage device such as a hard disk or a semiconductor storage device built in a computer system. The "computer-readable recording medium" may be a non-transitory computer-readable recording medium. The above program may be transmitted via an electric communication line.

The adaptive equalization FIR filter configured as described above has a feedforward following configuration circuit in addition to a conventional general adaptive equalization filter configuration, thereby achieving both a high dynamic following speed and a high distortion compensation resistance.

Variations

In the embodiment described above, another filter (e.g., an IIR filter) may be used instead of the FIR filter. In the above embodiment, the post-stage FIR coefficient computation unit 52 obtains the filter coefficient of the post-stage 2×2 FIR filter 42 by feedforward control using the minimum mean square error method. However, the post-stage FIR coefficient computation unit 52 may obtain the filter coefficient of the post-stage 2×2 FIR filter 42 by feedforward control using another method instead of the minimum mean square error method so as to reduce the error between the inputted symbol and the value of the known symbol.

Although an embodiment of the present invention has been described above in detail with reference to the drawings, specific configurations are not limited to the embodiment, and include designs and the like not departing from the spirit of the present invention.

INDUSTRIAL APPLICABILITY

The present invention is applicable to, for example, an optical transmission system. However, the use range of the present invention is not limited to that exemplified herein.

REFERENCE SIGNS LIST

1 Adaptive equalization FIR filter
11, 12, 13, 14 FIR filter (main signal FIR filter)
31, 33 Adder
41 Pre-stage 2×2 FIR filter
42 Post-stage 2×2 FIR filter
51 Pre-stage FIR coefficient computation unit
52 Post-stage FIR coefficient computation unit
61 CPR phase estimation unit
71 Convolution computation unit
80 Coefficient computation unit

The invention claimed is:

1. An adaptive equalization filter for an optical transmission system, the adaptive equalization filter comprising:
a main signal filter; and
a coefficient computator that updates a filter coefficient of the main signal filter,
wherein the coefficient computator includes:
a pre-stage filter and a post-stage filter that are connected in cascade, each having a sample of a main signal as an input;
a pre-stage coefficient computator that obtains a filter coefficient of the pre-stage filter by feedback control using a gradient method;
a post-stage coefficient computator that obtains a filter coefficient of the post-stage filter by feedforward control; and
a convolution computator that obtains the filter coefficient of the main signal filter by convolution computation of the filter coefficient of the pre-stage filter obtained by the pre-stage coefficient computator and the filter coefficient of the post-stage filter obtained by the post-stage coefficient computator.

2. The adaptive equalization filter according to claim 1, wherein the post-stage coefficient computator
obtains an inverse matrix of a covariance matrix of an input signal vector to the post-stage filter, and
obtains a correlation vector between a known signal symbol and the input signal vector to the post-stage filter
by using a plurality of sets of the input signal vector to the post-stage filter and the known signal symbol at a time position obtained by applying the post-stage filter to the input signal vector, and
applies the inverse matrix of the covariance matrix to the correlation vector to obtain the filter coefficient of the post-stage filter using a minimum mean square error method.

3. The adaptive equalization filter according to claim 1, wherein the post-stage filter is a filter having two inputs and two outputs, and
the post-stage coefficient computator obtains the filter coefficient of the post-stage filter, with one of coefficients of length M taps of two inputs of the post-stage filter denoted by hx[1], hx[2], . . . , and hx[M], and the other of the coefficients denoted by hy[1], hy[2], . . . , and hy[M], by selecting one or a plurality of tap time positions m from the M taps and performing, for each selected m, the steps of:
applying a filter coefficient at a tap time position other than the tap time position m to an input signal vector to the pre-stage filter to compute a provisional value y[m] of an output symbol of the post-stage filter;
calculating a complex error between a complex value of a known signal symbol corresponding to a time position of the provisional value y[m] and a complex value of the provisional value y[m];
using one or a plurality of sets of the complex error and an input signal vector to the post-stage filter used to compute the provisional value y[m] to
obtain an inverse matrix of a 2×2 covariance matrix of an input signal vector to the post-stage filter and
obtain a correlation vector between the complex error and the input signal vector to the post-stage filter; and
applying an inverse matrix of the 2×2 covariance matrix to the correlation vector to calculate hx[m] and hy[m] as a m-th tap coefficient, and
wherein m and M are positive integer.

4. The adaptive equalization filter according to claim 2, wherein the post-stage coefficient computator performs computation of multiplying each of the known signal symbols by a complex conjugate of a phase rotation amount predicted from an estimated frequency offset amount.

5. The adaptive equalization filter according to claim 4, wherein the post-stage coefficient computator further performs computation, for each of the known signal symbols, of multiplication by a complex conjugate of a carrier phase compensation amount for a symbol for which the carrier phase compensation amount has already been estimated, and multiplication by a complex conjugate of a representative value of a phase compensation amount of a symbol for which the carrier phase compensation amount has already been estimated for a symbol for which the carrier phase compensation amount has not been estimated yet.

6. The adaptive equalization filter according to claim 1, wherein the pre-stage coefficient computator obtains the filter coefficient of the pre-stage filter using the gradient method in a manner that an error between an output signal from the post-stage filter and a known signal decreases.

7. The adaptive equalization filter according to claim 1, wherein the pre-stage coefficient computator computes and updates the filter coefficient of the pre-stage filter by:

computing a complex error between a result of performing frequency offset compensation and carrier phase compensation on an output signal from the post-stage filter and a known symbol at a same time position;

calculating an inner product of an input sample to the pre-stage filter used to obtain the output signal from the post-stage filter and a coefficient of the post-stage filter, further applying the frequency offset compensation and the carrier phase compensation, and obtaining an update vector on a basis of a product of a complex conjugate of an application result and the complex error; and multiplying the update vector by a step size.

8. A filter coefficient update method for updating a filter coefficient of a main signal filter, wherein;

a pre-stage filter and a post-stage filter are connected in cascade with a sample of a main signal as an input, a pre-stage coefficient computator obtains a filter coefficient of the pre-stage filter by feedback control using a gradient method, a post-stage coefficient computator obtains a filter coefficient of the post-stage filter by feedforward control, and a convolution computator obtains the filter coefficient of the main signal filter by convolution computation of the filter coefficient of the pre-stage filter obtained by the pre-stage coefficient computator and the filter coefficient of the post-stage filter obtained by the post-stage coefficient computator.

\* \* \* \* \*